United States Patent
Van Wageningen et al.

(10) Patent No.: US 7,680,045 B2
(45) Date of Patent: Mar. 16, 2010

(54) PACKET SWITCHING DEVICE WITH A FEEDBACK METHOD OF THE ARBITER

(75) Inventors: Andries Van Wageningen, Wijlre (NL); Hans Juergen Reumerman, Aachen (DE); Armand Lelkens, Klimmen (NL); Rainer Schoenen, Aachen (DE)

(73) Assignee: NXP B.V., Eindhoven (NL)

( * ) Notice: Subject to any disclaimer, the term of this patent is extended or adjusted under 35 U.S.C. 154(b) by 1612 days.

(21) Appl. No.: 10/179,359

(22) Filed: Jun. 25, 2002

(65) Prior Publication Data

US 2003/0012210 A1 Jan. 16, 2003

(30) Foreign Application Priority Data

Jun. 26, 2001 (DE) ................. 101 30 749

(51) Int. Cl.
*G08C 15/00* (2006.01)
(52) U.S. Cl. ............... 370/232; 370/360; 370/419
(58) Field of Classification Search ........... 370/232, 370/360, 419, 229, 230
See application file for complete search history.

(56) References Cited

U.S. PATENT DOCUMENTS

| 5,126,999 | A | * | 6/1992 | Munter et al. ............. 370/415 |
| 5,835,696 | A | * | 11/1998 | Hess ..................... 714/10 |
| 5,881,308 | A | * | 3/1999 | Dwyer, III ................ 712/23 |
| 6,388,993 | B1 | * | 5/2002 | Shin et al. ................ 370/233 |
| 6,563,837 | B2 | * | 5/2003 | Krishna et al. ........... 370/413 |
| 6,574,232 | B1 | * | 6/2003 | Honig et al. ............. 370/413 |
| 6,614,796 | B1 | * | 9/2003 | Black et al. ............. 370/403 |
| 6,721,324 | B1 | * | 4/2004 | Shinohara ............. 370/395.1 |
| 6,747,954 | B1 | * | 6/2004 | Petersen et al. .......... 370/236 |
| 6,963,576 | B1 | * | 11/2005 | Lee .................... 370/411 |
| 2003/0021230 | A1 | * | 1/2003 | Kuo et al. .............. 370/230 |

FOREIGN PATENT DOCUMENTS

| WO | WO 00/38376 | * | 12/1998 |
| WO | 0038376 A1 | | 6/2000 |
| WO | 0119037 A1 | | 3/2001 |

* cited by examiner

*Primary Examiner*—Jayanti K Patel
*Assistant Examiner*—Bo Hui A Zhu

(57) ABSTRACT

The invention relates to a packet switching device comprising at least one line card (1 and 2) which device has an output port with a port control (6 and 7) for storage and arrangement of packets in output queues and for generating at least one feedback information unit to inform an arbiter (9) of statuses of the output queues of the output port. The packet switching device also comprises at least one switch card (3 to 5) consisting of a crosspoint matrix and the arbiter (9) for controlling the crosspoint matrix (8).

18 Claims, 2 Drawing Sheets

PACKET SWITCHING DEVICE WITH A FEEDBACK METHOD OF THE ARBITER

Figure 1:
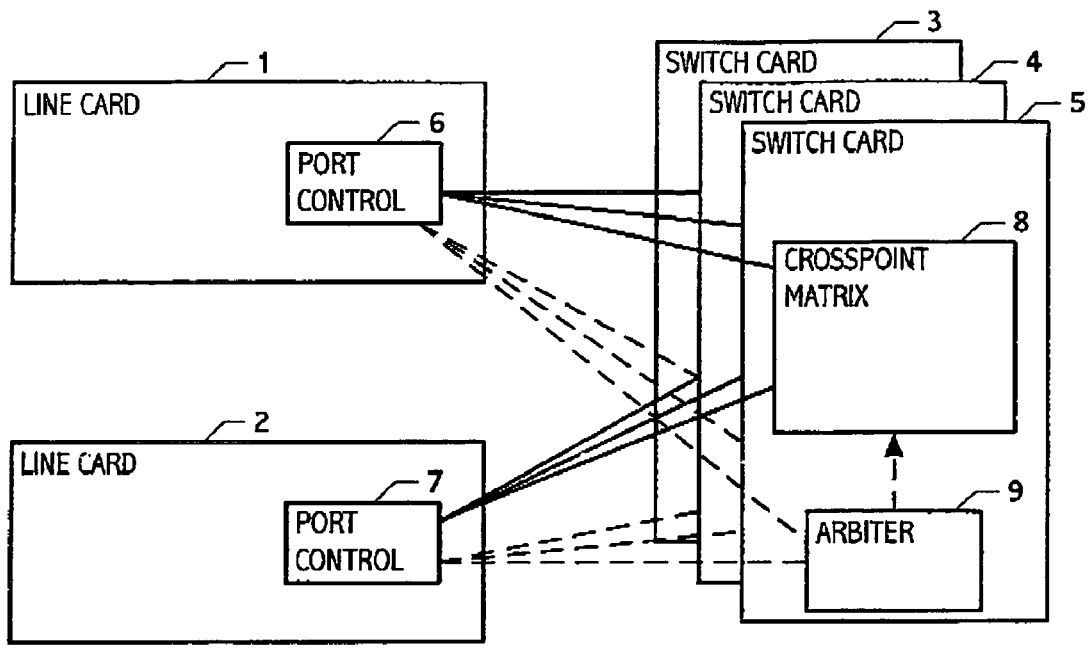

The invention relates to packet switching device comprising a plurality of line cards and switch cards.

The publication "Weighted Arbitration Algorithms with Priorities for Input Queued Switches with 100% Throughput" by R. Schoenen, G. Post, G. Sander, Broadband Switching Symposium '99, compares various weighted switching algorithms of a packet switching device. The switching algorithms attempt with various switching steps to prevent a collision of several packets intended for the same output port of the packet switching device and reduce the resulting data loss or delay. The method of taking into account the statuses of the output port during switching is not mentioned in the publication.

The invention therefore has for an object to guarantee loss-free switching of data in the form of packets at the output port.

This object is achieved by a packet switching device comprising
  at least one line card which contains an output port with a port control for storage and arrangement of packets in output queues and for generating at least one feedback information unit for information from an arbiter about the statuses of the output queues at the output port,
  and at least one switch card comprising a crosspoint matrix and the arbiter to control the crosspoint matrix.

A packet switching device comprises several line cards and several switch cards. The line card includes as an essential component a port control. Each port control is connected with a plurality of parallel switch cards and its task is to arrange the incoming packets to the packet switching device by priority and desired output port of the packet switching device. The arrangement of the packets by priority and desired output port in the port control of the packet switching device is known as the virtual output queue (VOQ).

The port control has information on the condition, known as status information, of the virtual output queue and sends this to the switch cards at regular intervals.

Each switch card consists of a crosspoint matrix and an arbiter. The configuration of the crosspoint matrix is redetermined at regular intervals by the arbiter and new combinations produced between the input and output ports of the packet switching device for switching the packets.

At the output of each port control the data packets are buffered in queues before they leave the port control and the packet switching device. If the operating speed of the output port is lower than the operating speed of the packet switching device, the data packets cannot leave the output port sufficiently quickly and the queues are overfilled with data packets.

To inform the input port of the overfilling of the queues at the output port, the port control generates feedback information units.

An information flow consisting of feedback information units, which information flow is required for feedback between the output port and input port is created not via a direct combination, but via an indirect combination. With a direct combination for example feedback information units can be sent from the output ports to the input ports via the packet switching device. With an indirect combination the feedback information units generated by the port control of the output port are sent to the arbiter. The arbiter collects the received feedback information units and uses them in decisions on combining the input ports with the output ports. As the results from the arbiter are passed to the input ports (and also to the crosspoint matrix) and the results from the arbiter are influenced by the feedback information units from the output ports, implicitly the feedback information units of the output ports flow to the input ports.

The feedback information units can be retained by the arbiter in a feedback vector. Using the feedback information units the arbiter reduces the possible combinations between an input port and an output port of the packet switching device. The feedback vector contains several elements, each element representing a feedback information unit reflecting the status of an output port in each case.

The switching takes place with the feedback vector. A status matrix of the packet switching device contains several elements which represent a weighting of each combination of an input port to an output port. Elements of the status matrix which are less than or equal to the corresponding element of the output port are not taken into account in the switching. The corresponding input ports cannot send data packets to output ports that are not taken into account. Elements of the status matrix which are greater than the corresponding element in the feedback vector are taken into account in the switching.

The invention also relates to a line card for a packet switching device with an output port and a port control for generating at least one feedback information unit to inform an arbiter of statuses of the queues of the output port.

The invention also relates to a switch card consisting of the crosspoint matrix and an arbiter to control the crosspoint matrix for a packet switching device with at least one line card which has an output port and a port control to generate at least one feedback information unit for information to an arbiter on statuses of the queues of the output port.

The invention will be further described with reference to an example of embodiment shown in the drawings, to which however the invention is not restricted. These show:

FIG. 1 a packet switching device

Figure 2:
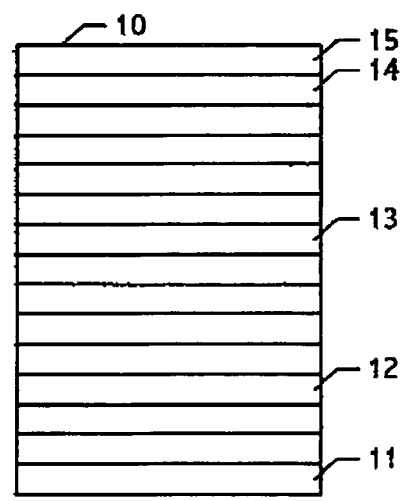

FIG. 2 states of a memory in the output port

Figure 3:
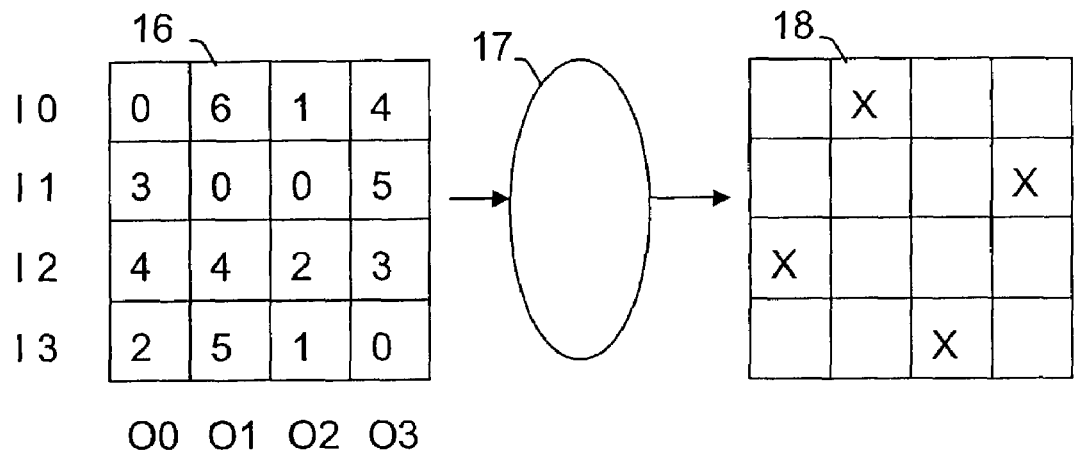
Figure 4:
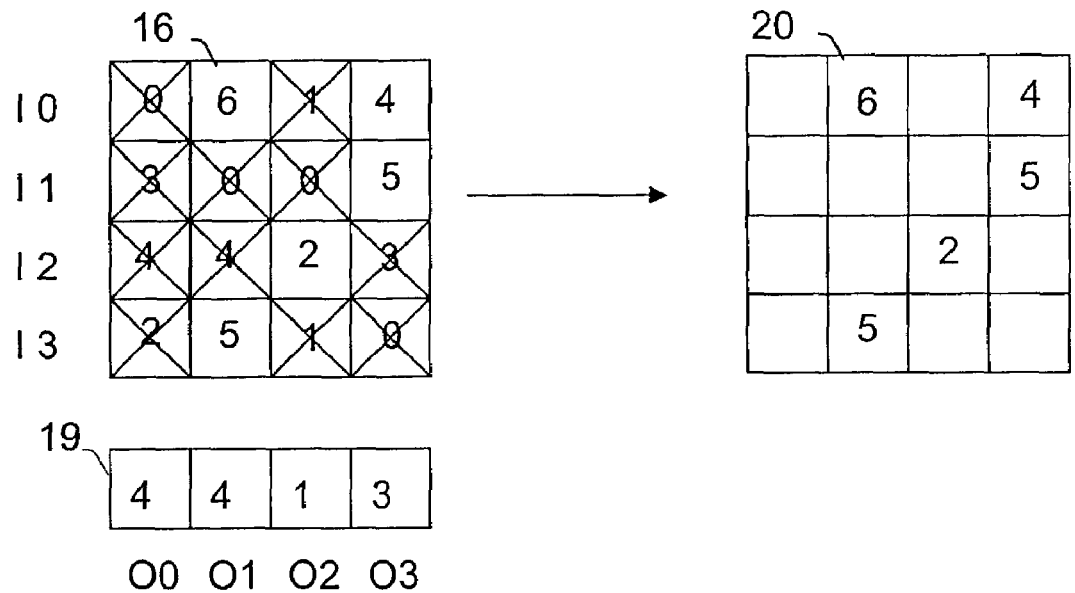
Figure 4:
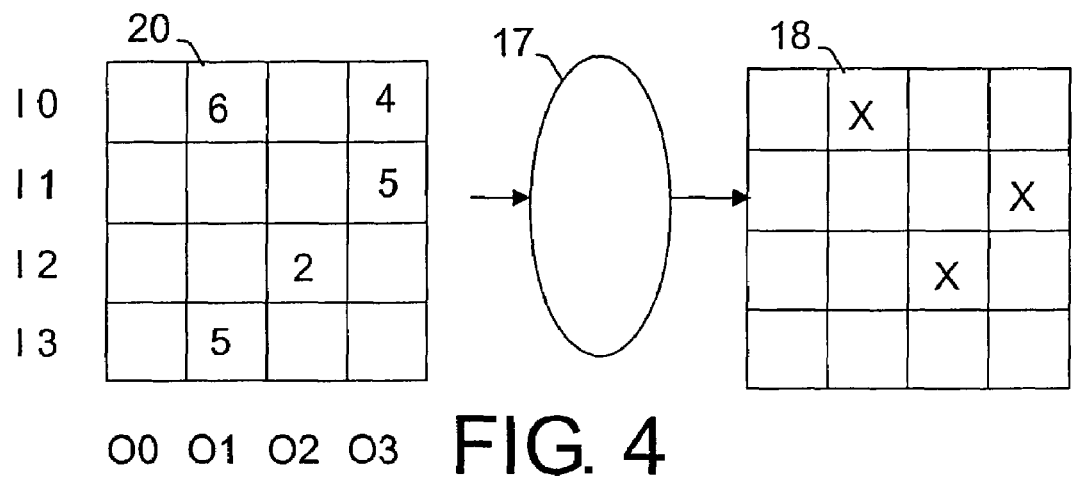

FIG. 3 a representation of a status and decision matrix to combination the input and output ports, and FIG. 4 a representation of the status and decision matrix to combination the input and output ports with a feedback vector.

A packet switching device shown in FIG. 1 consists of two line cards 1 and 2 and several switch cards 3 to 5. The number of line cards 1 and 2 is often much greater than two, e.g. 64, in the example of embodiment it is restricted to two for clarity. The line cards 1 and 2 each consist of different components not relevant for the description of the example of embodiment and therefore not shown, such as an optical transfer unit, frame generator, network processor etc., and a port control 6 and 7 essential for the example of embodiment. Each switch card 3 to 5 consists of a crosspoint matrix 8 and an arbiter 9. Both the arbiter 9 and the crosspoint matrix 8 of each parallel switch card 3 to 5 are connected with the respective port control 6 and 7.

Data packets of constant length are known as cells and are used in switching. As cells of constant length are easier to method in switching than packets of varying size, the incoming packets are divided within the line cards 1 and 2 into cells of constant length and stored temporarily in output queues. After successful switching i.e. accepted allocation of an input port to a respective output port, the cells are removed from the output queue.

Using weighting, the port control can inform the arbiter whether and how urgently the cell in the input port should be switched. Weighting can contain data on the priority and class of the packets or the waiting time and size of a queue in the input port.

The port control 6 and 7 sends the information necessary to determine the configuration of the crosspoint matrix including the weighting to the arbiter 9. The information contains several information units describing the statuses of both the input ports and the output port. If in an output port of the packet switching device there is no more capacity for further cells, this is taken into account by the arbiter in determining the configuration.

When the arbiter has determined the configuration of the crosspoint matrix 8 and sent the configuration both to the port control and to the crosspoint matrix, the crosspoint matrix 8 of each switch card is configured accordingly. The port control 6 and 7 sends the cells at regular intervals, known as cell periods, to the crosspoint matrix 8 for switching.

FIG. 2 shows the different statuses of a memory 10 of the output ports. The output queues of cells in the output port are created by a common memory. The size of the memory currently available in the output port can be interpreted as a guideline value, according to which the cells are switched with corresponding priority to the output port.

The memory statuses are divided into several stages 11 to 15. The memory is empty when the memory status reaches stage 11. The memory is almost empty when the memory status assumes stage 12. The memory is half full when the memory status reaches stage 13, and stage 14 corresponds to the status almost full. At stage 15 the memory is full and can take no more cells.

In the full and almost full statuses (stages 14 and 15) of the memory, the arbiter 9 switches no cells to these output ports. If the memory contains none or only a few cells, the memory status (stage 12 and 13) is empty or almost empty. In this case the arbiter can switch cells with any priority to this output port. In the half-full status (stage 13) of the memory, the arbiter 9 does not switch cells with a low priority to this output port and keeps the remaining part of the memory free for switching cells with higher priority.

The feedback information units contain information about the memory status of an output port.

FIG. 3 describes the switching of a packet switching device with four input ports I0 to I3 and four output ports O0 to O3. A status matrix 16 contains sixteen elements which represent the weighting of each combination of an input port I0 to I3 with an output port O0 to O3. If the weighting of the cells is reduced to a minimum number of bits (one bit), the status matrix 16 consists of several ones and zeros which as binary figures only contain one item of information, namely whether a cell is present or not for switching in the corresponding input port. During the switching 17 the arbiter 9 calculates the resulting combinations. In a decision matrix 18 the resulting combinations are marked.

The switching of cells means a combining of the input port of the packet switching device to the output port. In determining the combinations the arbiter 9 uses the status matrix 16, and from the status matrix 16 selects the highly weighted combinations using a corresponding algorithm. When the arbiter has determined a combination for each input port or output port, these combinations are marked in the decision matrix 18 and the crosspoint matrix 8 configured according to the decision matrix 18.

To explain the example of embodiment according to the invention an SIMP algorithm is used as a decision algorithm. The algorithm working by columns of the status matrix is described in more detail in the publication "Weighted Arbitration Algorithms with Priorities for Input-Queued Switches with 100% Throughput" by R. Schoenen, G. Post, G. Sander, Broadband Switching Symposium '99. Other algorithms e.g. a T-SIMP algorithm working row by row can also be used for this example.

As in the column of status matrix 16 of the first output port O0 the element with the value four is greater than the other elements of the first column, this combination is accepted by the switching 17 and marked in the decision matrix 18. At the second output port O1 the next combination is accepted in the same way until each output port has an accepted combination. An output port cannot be combined simultaneously with two input ports and an input port cannot be allocated to two output ports. For this reason the first output port O0 is combined with the third input port I2, the second output port O1 with the first input port I0, the third output port O2 with the fourth input port I3 and the fourth output port O3 with the second input port I1 as all other input ports are no longer available in this cell period.

FIG. 4 describes the switching of the packet switching device with four input ports I0 to I3 and four output ports O0 to O3 using a feedback method which is performed using a feedback vector 19 and takes into account the status of the queue at the output port when the cells are switched. The status matrix 16, switching 17 and decision matrix 18 described in FIG. 3 are complemented by a second status matrix 20 and the feedback vector 19. The feedback vector 19 contains four elements, each element representing a feedback information unit reflecting the status of an output port. The status matrix 20 consists of elements of the status matrix 16 determined using the feedback vector during the switching 17.

The function of the switching corresponds to that described for FIG. 3. It differs in the use of the feedback vector 19. Elements of the status matrix 16 which are less than or equal to the corresponding element of the output port are not considered in the switching (marked with a cross in FIG. 4). The corresponding input ports I0 to I3 cannot send cells to the output ports O0 to O3. Elements of the status matrix 16 which are greater than the corresponding element in feedback vector 19 are taken into account in the switching. These elements determined and filtered by the feedback vector 19 can be found in the status matrix 20.

For the first output port O0 no input port can be switched since all elements in the first column are less than or equal to the corresponding element of the feedback vector. For this reason, status matrix 20 contains no element in the first column. For the second output port O1 two elements (six and five) of the status matrix 16 are available so that these two elements can be found in the second column as status matrix 20. For the third output port O2 only one element of the status matrix 16 is available so that only the third input port is considered for switching and retained in the third column of the status matrix 20. For the fourth output port O3 two elements are available, and these two elements are noted accordingly in the fourth column of status matrix 20.

During the switching 17 the output port O1 is combined with the input port I0 taking into account the elements of status matrix 20 and marked accordingly in the decision matrix 18. As the input port I0 was already accepted as a combination with the second output port O2, the output port O3 can only be combined with the input port I1.

The invention claimed is:

1. A packet switching device having one or more input ports and one or more output ports, the packet switching device providing for switching of one or more data packets among the one or more input ports and the one or more output ports, the packet switching device comprising:

a crosspoint matrix, the crosspoint matrix providing for switching of the one or more data packets as to the one or more input ports and the one or more output ports;

a port control coupled to the crosspoint matrix, the port control having a virtual output queue associated with the one or more output ports and providing status information, the status information including (i) weighting associated with the one or more input ports and (ii) feedback information as to the virtual output queue; and an arbiter, the arbiter coupled to the port control so as to receive the weighting and feedback information and coupled to the crosspoint matrix so as to provide for configuration of the crosspoint matrix, the arbiter supporting a first status matrix, a second status matrix, and a decision matrix, wherein (a) the first status matrix includes elements, the elements representing the weighting of combinations of each respective one of the one or more input ports with each respective one of the one or more output ports, (b) the second status matrix includes a reduced set of the elements of the first status matrix, the reduced set being determined responsive to the feedback information and the first status matrix, and (c) the decision matrix includes marked combinations representing elements of the second status matrix as determined through switching, wherein the marked combinations providing for configuration of the crosspoint matrix and wherein the arbiter is configured to pass at least one of the marked combinations to at least one of the one or more input ports.

2. A packet switching device as claimed in claim 1, further comprising a memory for storage and arrangement of the one or more data packets in one or more queues and wherein the port control is configured to provide feedback information in the form of a feedback information unit as to at least one of the one or more queues.

3. A packet switching device as claimed in claim 2, wherein the port control comprises the memory.

4. A packet switching device as claimed in claim 1, wherein the port control is configured to provide status information at regular intervals.

5. A packet switching device as claimed in claim 1, wherein the port control is configured to send data packets to the crosspoint matrix at regular intervals.

6. A packet switching device as claimed in claim 1, wherein the arbiter is configured to provide for configuration of the crosspoint matrix at regular intervals.

7. A packet switching device as claimed in claim 6, wherein the arbiter is configured to provide for re-configuration of the crosspoint matrix at regular intervals based on new elements of the first status matrix, such new elements representing the new combinations of each respective one of the one or more input ports with each respective one of the one or more output ports.

8. A packet switching device as claimed in claim 1, wherein the arbiter is configured to retain feedback information units in a feedback vector.

9. A packet switching device as claimed in claim 1, wherein the arbiter is configured to send the configuration of the crosspoint matrix to the port control.

10. A packet switching device as claimed in claim 1, wherein the port control provides the feedback information unit representative of at least the stage of a memory associated with the virtual output queue.

11. A packet switching device as claimed in claim 10, wherein the arbiter is configured to provide for configuration of the crosspoint switch so that, responsive to the stage representing the memory being full or substantially full, no data packet is switched to the one or more output ports associated with such memory.

12. A packet switching device as claimed in claim 1, wherein the port control provides the weighting as configured to represent the presence of at least one data packet.

13. A packet switching device as claimed in claim 12, wherein the port control provides the weighting as configured to represent urgency for switching of the at least one data packet that is present.

14. A packet switching device as claimed in claim 13, wherein the port control provides the weighting as configured to represent urgency, the urgency reflecting, as to the at least one data packet that is present, either or both of priority or/and class.

15. A packet switching device as claimed in claim 1, wherein the arbiter is configured such that the decision matrix implements switching through application of a predetermined decision algorithm.

16. A packet switching device as claimed in claim 15, wherein the arbiter is configured such that the decision matrix implements switching through application of a SIMP algorithm.

17. A packet switching device as claimed in claim 15, wherein the arbiter is configured such that the decision matrix implements switching responsive to highly weighted combinations.

18. A packet switching device having one or more input ports and one or more output ports, the packet switching device providing for switching of one or more data packets among the one or more input ports and the one or more output ports, the packet switching device comprising:

a crosspoint matrix, the crosspoint matrix providing for switching of the one or more data packets as to the one or more input ports and the one or more output ports;

a port control coupled to the crosspoint matrix, the port control having a virtual output queue associated with the one or more output ports and providing status information, the status information including (i) weighting associated with the one or more input ports and (ii) feedback information as to the virtual output queue; and an arbiter, the arbiter coupled to the port control so as to receive the weighting and feedback information and coupled to the crosspoint matrix so as to provide for configuration of the crosspoint matrix, the arbiter supporting a first status matrix, a second status matrix, and a decision matrix, wherein (a) the first status matrix includes elements, the elements representing the weighting of combinations of each respective one of the one or more input ports with each respective one of the one or more output ports, (b) the second status matrix includes a reduced set of the elements of the first status matrix, the reduced set being determined responsive to the feedback information and the first status matrix, and (c) the decision matrix includes marked combinations representing elements of the second status matrix as determined through switching, wherein the marked combinations providing for configuration of the crosspoint matrix and wherein the arbiter is configured to send the configuration of the crosspoint matrix to the port control.

* * * * *